Patented Sept. 4, 1945

2,384,009

UNITED STATES PATENT OFFICE 2,384,009

PROCESS FOR RECOVERING MAGNESIUM SALTS

Hellmuth R. Brandenburg, Cowell, Calif., assignor to Idaho Maryland Mines Corporation, San Francisco, Calif., a corporation of Nevada No Drawing. Application October 23, 1942, Serial No. 463,304

13 Claims. (Cl. 23—50)

This invention relates to and has for its object the provision of a process for recovering magnesium salts from products resulting from the calcination short of dead burning of unstable hydrous magnesium silicates such as serpentine, genthite, garnierite and the like.

The calcination of minerals or rocks of this type short of dead burning produces, as set forth in my copending application Serial No. 459,044, filed September 19, 1942, a relatively high yield of available magnesium oxide mixed with gangue, magnesium silicate, silica, alumina, lime, magnesium chromate, magnesium manganate, and a nickel salt. The resulting calcine is particularly characterized in that its residual water of combination content lies between 0.6% and 8.0% and contains no free iron. All of the compounds in the calcine other than the available magnesium oxide may for the purposes of this invention be regarded as foreign matter.

Although the object of this invention primarily resides in the recovery of magnesium salts from the calcination of unstable hydrous magnesium silicates, any one or all of the steps involved in my process may be applied to the recovery of magnesium salts and salt solutions from magnesium oxides, regardless of the source of the oxide and the source of the foreign matter admixed therewith.

Magnesium oxide, which is basic in character, reacts with most common acids such as hydrochloric, sulphuric, or nitric acid to form water soluble magnesium salts, which if properly treated can be recovered in a very high degree of purity, either as a solution or in crystalline form.

Briefly, my process consists in treating the calcine or other source of magnesium oxide with a suitable acid to produce in solution the desired magnesium salt together with other metallic salts, filtering or sedimenting the gangue, flocculating from the filtrate any silica that may be present, successively precipitating any undesired metallic salts, and evaporating out the desired magnesium salt.

In applying my process to the product resulting from the calcination short of dead burning of an unstable hydrous magnesium silicate, I introduce the calcine, preferably direct from the kiln, and while at an elevated temperature into a tank or vat provided with a suitable agitator and containing a sufficient quantity of a mineral acid (such as for example hydrochloric acid if the final product desired is magnesium chloride) to substantially completely react with the available magnesium oxide content of the calcine.

The addition of too much acid is undesirable for it results in dissolving undue amounts of silica, iron and other impurities, which would put the gangue in an unfilterable condition as well as introduce undesirable soluble matter. I have found that if the hydrogen ion concentration of the solution is maintained at a pH value of not less than 6, the amount of silica and iron dissolved is not detrimental and the gangue may be readily filtered. Preferably, the pH value of the solution should be kept at about 7.4, although a lower hydrogen ion concentration (that is, a higher pH value) in no way impairs the process.

The acid reacts with the available magnesium oxide to produce a water-soluble salt; also upon continued agitation of the slurry coagulation results. I have found that coagulation is substantially coincident with the completion of the reaction between the acid and the magnesium oxide. Since this coagulation is subject to visual perception, it may be used in gaging the end point of the acid-magnesium oxide reaction.

Since the final recovery of the magnesium salt is effected by evaporation, other things being equal, the quantity of liquor held in process should be kept as low as possible consistent with maintenance of the slurry at a thickness capable of being handled by the agitator or filter. In this connection I have found that with a calcine containing about 15% magnesium oxide, a hydrochloric acid concentration of 2 normal will give a solid to solution ratio of about 1 to 4, which meets the conditions required by the agitator and filter and give a liquor which can be economically evaporated in the final step of the process.

The slurry so produced and in which the hydrogen ion concentration and the ratio of solid to solution is adjusted, as above set forth, may then be subjected to sedimentation or filtration in order to separate the gangue. The resulting supernatant liquid or filtrate will be found to be far from being saturated with the magnesium chloride or other desired magnesium salt, and consequently this weak saline solution is preferably recycled through the vat or tank in which further quantities of calcine and acid are added in the manner set forth until a sufficient concentration of the desired magnesium salt is found to be present in the supernatant liquid or filtrate.

The next step in the process is to separate out soluble silica which may be done by raising the temperature of the solution to 224° F. or higher, and evaporating the solution until all or substantially all of the silica present is flocculated or salted out, and the resulting liquor is of syrupy consistency. In carrying out this step care should be taken not to evaporate the liquor to a point where it is supersaturated with respect to the magnesium chloride or other desired salt, and thus to prevent this salt from crystallizing out during the subsequent treatment. The limiting point may be determined by taking samples of the hot liquor and cooling it to the ambient temperature to see whether the magnesium salt crystallizes out. If it does, water or fresh filtrate or supernatant liquid may be added to the liquor. The flocculated silica is then separated from the liquor by either sedimentation or filtration.

To the hot supernatant liquor or filtrate is added magnesium oxide in an amount slightly in excess of the theoretical quantity required to react with and precipitate any aluminum, manganese, and nickel which may be in solution. The introduction, however, of a greater quantity of magnesium oxide does no particular harm. Since the magnesium oxide acts as a base, the aluminum, manganese, and nickel will be precipitated out as the hydroxides of these metals, which can be readily separated from the solution by either sedimentation or filtration.

Following or concurrently with the removal of the aluminum, manganese, and nickel, any chromium which may be present in solution may be precipitated out by the addition of lead oxide (litharge) and the resulting insoluble lead chromate may then be separated from the solution by sedimentation or filtration.

It is also possible to combine the three preceding steps into a single step by adding the magnesium oxide and lead oxide to the original saline liquor and salting out. The magnesium oxide precipitates the aluminum, manganese and nickel; the lead oxide (litharge) precipitates the chromium; and the raising of the temperature of the solution to 224° F. or higher and evaporating the solution will salt out the silica present.

If the resulting filtrate contains any appreciable amount of calcium which should be removed, the solution may be cooled to approximately room temperature and, in any event, to a temperature not higher than 160° F., and then treated with an alkali bicarbonate in an amount not less than 5% to 25% greater than that theoretically required to precipitate out the calcium as calcium carbonate. The calcium carbonate, as in the case of the preceding precipitates, may be removed by either sedimentation or filtration. The magnesium salts will not be precipitated out unless the process step is held for too long a time or unless too much alkali bicarbonate is used.

The resulting supernatant liquor or filtrate will consist of a substantially pure solution of a magnesium salt (magnesium chloride if hydrochloric acid is resorted to) containing only minute quantities of the alkali bicarbonate used for the removal of the calcium and possibly a minute quantity of an alkali salt of the acid originally used. The slight amount of the alkali bicarbonate salt may be converted into the sodium salt of the acid used by the addition of a small amount of this acid.

The resulting solution of the desired magnesium salt can then be evaporated to recover the desired salt having a purity of about 99.6%.

I claim:

1. The process of recovering a magnesium salt solution from unstable hydrous magnesium silicate such as serpentine, genthite, and garnierite, comprising calcining said silicate to a point at which its residual water of combination is below 8% but short of complete dehydration and without dead burning, agitating the resulting calcine with an acid solution to extract a water soluble salt of magnesium, adjusting the hydrogen ion concentration of the resulting salt solution to a pH value of not less than 6 and separating the gangue from the salt solution.

2. The process of recovering a magnesium salt from calcined unstable hydrous magnesium silicate such as serpentine, genthite, and garnierite, containing between 0.6% and 8.0% residual water of combination comprising: agitating the calcine with an acid solution while it still retains heat from the calcining operation; adjusting the hydrogen ion concentration of the resulting salt solution to a pH value of not less than 6; separating the gangue from the solution; and then evaporating the liquid to produce said magnesium salt.

3. The process of separating silica from a magnesium salt solution, comprising: evaporating the solution at a temperature of at least 224° F. until the solution attains a syrupy consistency but short of the point where it would be saturated with respect to the magnesium salt at the ambient temperature; and then separating deposited silica from the solution.

4. The process of recovering a magnesium salt from a magnesium bearing solution contaminated with silica, comprising: evaporating the solution at a minimum temperature of 224° F. until the solution attains a syrupy consistency but short of the point where the solution would be saturated with respect to the said magnesium salt at the ambient temperature; separating the deposited silica from the solution; and then evaporating the resulting solution to produce said salt.

5. The process of recovering a magnesium salt solution from unstable hydrous magnesium silicate such as serpentine, genthite, and garnierite, comprising calcining said silicate to a point at which its residual water of combination is below 8% but short of complete dehydration and without dead burning, agitating the resulting calcine in an acid solution until the acid has been consumed; adjusting the pH value to not less than 6; separating the gange from the slurry; elevating the temperature of the resulting solution to boiling to convert any soluble silica that may be present to insoluble flocculent form; separating the flocculated silica from the solution; precipitating and separating from the solution any remaining metallic impurities; and finally isolating the desired magnesium salt.

6. The process of recovering a magnesium salt from a solution of such a salt contaminated with silica, aluminum, manganese, nickel, and chromium, comprising: evaporating the solution at a minimum temperature of 224° F., but short of the point where the solution would be saturated with respect to the magnesium salt at the ambient temperature; separating from the solution the silica precipitated by this step; adding thereto magnesium oxide in an amount in excess of that theoretically required completely to react with the aluminum, manganese, and nickel in solution so as to precipitate these metals in the form of hydroxides; separating these hydroxides from the solution; adding lead oxide to the solution to precipitate the chromium as lead chromate; separating the lead chromate; and finally evaporating the solution so purified to produce said magnesium salt.

7. The process of recovering a mineral acid magnesium salt from a solution of such a salt contaminated with silica, aluminum, manganese, nickel, chromium, and calcium, comprising: evaporating the solution at an elevated temperature, but short of the point where the solution would be super-saturated with respect to the magnesium salt at the ambient temperature; separating from the solution the silica thrown out by this step; adding thereto magnesium oxide in an amount in excess of that theoretically required completely to react with the aluminum, manganese and nickel in solution so as to precipitate these metals in the form of hydroxides; separating these hydroxides from the solution; adding lead oxide to the solution to precipitate the chromium as lead chromate; separating the lead chromate; lowering the temperature of the solution to not higher than 160° F.; adding an excess of an alkali bicarbonate to precipitate the calcium as a carbonate; separating the calcium carbonate and finally evaporating the solution so purified to produce said magnesium salt.

8. The process of recovering a magnesium salt solution from an unstable hydrous magnesium silicate such as serpentine, genthite, and garnierite, calcined to a residual water of combination content of between 0.06% and 8.0% and containing compounds of aluminum, manganese, nickel and chromium, comprising: agitating the calcine with an acid solution; separating the gangue from the salt solution by filtration methods; adding magnesium oxide and lead oxide, raising the temperature of the solution to at least 224° F. for precipitating the aluminum, manganese, nickel and chromium, and for displacing the soluble silica from the solution, and removing the impurities displaced by the oxide addition.

9. The process of recovering a magnesium salt solution from an unstable hydrous magnesium silicate such as serpentine, genthite, and garnierite, calcined to a residual water of combination content of between 0.6% and 8.0% and containing compounds of aluminum, manganese, nickel and chromium, comprising: agitating the calcine with an acid solution; adjusting the hydrogen ion concentration of the resulting salt solution to a pH not less than 6; separating the gangue from the salt solution by filtration methods; restoring the acid strength of the weak salt solution by the addition of strong acid; adding more calcine to the solution and again removing gangue, and continuing the addition of acid and calcine and the removal of gangue until the solution has a sufficient concentration of the desired magnesium salt; and purifying the solution by removing the aluminum, manganese, nickel, chromium and silica.

10. The process of recovering a magnesium salt solution from an unstable hydrous magnesium silicate such as serpentine, genthite, and garnierite, calcined to a residual water of combination content of between 0.6% and 8.0% and containing compounds of aluminum, manganese, nickel and chromium, comprising: agitating the calcine with an acid capable of extracting water soluble salt of magnesium; separating the gangue from the resulting salt solution by filtration methods; adding magnesium oxide and lead oxide, raising the temperature of the solution to at least 224° F. for precipitating the aluminum, manganese, nickel and chromium, and for displacing the soluble silica, removing the impurities separated by the oxide addition and recycling the weak salt solution by adding further quantities of calcine and acid and again removing the gangue and purifying the solution in the manner indicated until the solution has a sufficient concentration of the desired magnesium salt.

11. The process of recovering a magnesium salt solution from an unstable hydrous magnesium silicate such as serpentine, genthite, and garnierite, incompletely calcined and containing compounds of aluminum, manganese, nickel and chromium, comprising: agitating the calcine with an acid solution capable of dissolving magnesium oxide to produce a water soluble salt of magnesium; separating the gangue from the resulting salt solution by filtration methods; adding magnesium oxide and lead oxide, raising the temperature of the solution to at least 224° F. for precipitating the aluminum, manganese, nickel and chromium, and for displacing the soluble silica, removing the impurities separated by the oxide addition, recycling the weak salt solution with the addition of further quantities of calcine and acid and again removing the gangue and purifying the solution in the manner indicated until the solution has a sufficient concentration of the desired magnesium salt, and adding an excess of an alkali bicarbonate to precipitate the calcium as a carbonate.

12. The herein described process of recovering magnesium salts from magnesium oxides in admixture with compounds of aluminum manganese, nickel and chromium which comprises: agitating the admixture with an acid solution capable of producing water soluble salts of magnesium; separating the gangue from the salt solution by filtration methods; adding magnesium oxide and lead oxide, and raising the temperature of the solution to a minimum of 224° F. for precipitating the aluminum, manganese, nickel and chromium, and for converting the soluble silica into insoluble and removable form; removing the precipitates and insoluble matter freed by said addition and conversion; adding an amount of an alkali bicarbonate in excess of the amount theoretically required to precipitate the calcium as a carbonate; and finally evaporating the remaining solution to produce said magnesium salt.

13. The process of recovering a magnesium salt from a magnesium salt solution contaminated with a chromium salt, comprising adding lead oxide to the solution to form and precipitate insoluble lead chromate from the magnesium salt solution; separating the lead chromate from the solution; and finally evaporating the remaining magnesium salt solution to recover the magnesium salt.

HELLMUTH R. BRANDENBURG.